United States Patent
Chiesa et al.

(10) Patent No.: US 12,301,467 B2
(45) Date of Patent: May 13, 2025

(54) DIFFERENTIAL PATH ROUTING OF MULTIPLE SUB-FLOWS SPLIT FROM LARGER BANDWIDTH TRAFFIC FLOW

(71) Applicant: Cisco Technology, Inc., San Jose, CA (US)

(72) Inventors: Luca Della Chiesa, Cesenatico (IT); Christian Schmutzer, Koenigsbrunn im Weinviertel (AT); Raghupathi Somashekarappa, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 261 days.

(21) Appl. No.: 17/968,071

(22) Filed: Oct. 18, 2022

(65) Prior Publication Data

US 2024/0129250 A1     Apr. 18, 2024

(51) Int. Cl.
*H04L 47/28*   (2022.01)
*H04L 47/56*   (2022.01)

(52) U.S. Cl.
CPC .............. *H04L 47/28* (2013.01); *H04L 47/56* (2013.01)

(58) Field of Classification Search
CPC ................................ H04L 47/28; H04L 47/56
USPC ........................................................ 709/238
See application file for complete search history.

(56) References Cited

U.S. PATENT DOCUMENTS

| | | |
|---|---|---|
| 2011/0076031 A1 | 3/2011 | Surek et al. |
| 2015/0350114 A1 | 12/2015 | Ling et al. |
| 2021/0203577 A1 | 7/2021 | Schmutzer et al. |
| 2022/0103480 A1 | 3/2022 | Chiesa et al. |

FOREIGN PATENT DOCUMENTS

| | | | | |
|---|---|---|---|---|
| CN | 108989148 A | | 12/2018 | |
| CN | 114785757 B | * | 10/2023 | ........... H04L 45/245 |
| KR | 102093351 B1 | * | 3/2020 | |
| WO | WO-2019114926 A1 | * | 6/2016 | ............. H04L 45/24 |

OTHER PUBLICATIONS

Chen, X., "Minimum cost multi-path parallel transmission with delay constraint by extending openflow," China Communications, DOI: 10.1109/CC.2018.8331988, https://www.researchgate.net/publication/324257331, Mar. 2018, 12 pages.

(Continued)

*Primary Examiner* — Glenford J Madamba
(74) *Attorney, Agent, or Firm* — Edell, Shapiro & Finnan, LLC

(57) ABSTRACT

A method is provided to compensate for differential delay among a plurality of paths between first and second nodes in a network. The method may involve measuring delay for each of the plurality of paths for a plurality of sub-flows transmitted between the first node and the second node on respective paths of the plurality of paths. The plurality of sub-flows are obtained by splitting a traffic flow. The method involves determining delay differences among the delay for each of the plurality of paths, and adjusting, based on the delay differences, a queue delay associated with a respective flow of the plurality of sub-flows on one or more of the plurality of paths to achieve a path delay that is equal to a target path delay for each of the plurality of paths.

20 Claims, 10 Drawing Sheets

(56) References Cited

OTHER PUBLICATIONS

Dumphart, G. et al., "Inter-Node Distance Estimation from Multipath Delay Differences of Channels to Observer Nodes," IEEE ICC 2019, https://arxiv.org/abs/1902.04350, Feb. 12, 2019, 8 pages.

Cisco, "CEM Generic Configuration Guide, Cisco IOS XE 17 (Cisco NCS 4200 Series)," https://www.cisco.com/c/en/us/td/docs/routers/ncs4200/configuration/guide/cem-line-cards/17-1-1/b-cem-generic-xe-ncs4200.html, Apr. 11, 2022, 140 pages.

Schmutzer, C., et al., Network Working Group, "Circuit Style Segment Routing Policies, " https://datatracker.ietf.org/doc/draft-schmutzer-pce-cs-sr-policy-02/, May 5, 2022, 22 pages.

Zhang, L., "VirtualClock: A New Traffic Control Algorithm for Packet Switching Networks," SIGCOMM 1990, ACM SIGCOMM Computer Communication Review, vol. 20, No. 4, https://dl.acm.org/doi/10.1145/99517.99525, Aug. 1, 1990, 11 pages.

Wikipedia, "Earliest deadline first scheduling," https://en.wikipedia.org/wiki/Earliest_deadline_first_scheduling, Oct. 12, 2022, 6 pages.

* cited by examiner

DIFFERENTIAL PATH ROUTING OF MULTIPLE SUB-FLOWS SPLIT FROM LARGER BANDWIDTH TRAFFIC FLOW

TECHNICAL FIELD

The present disclosure relates to data networking.

BACKGROUND

Private line emulation (PLE) is an emulation protocol that enables the transparent transport of client traffic across a packet switched network. This protocol is intended to address use cases where a network user requires guaranteed bandwidth and bit transparency from the service provider without deploying a dedicated Optical Transport Network (OTN) switched network.

When carrying client connections of similar or identical capacity compared to that of the network interfaces (for example, a 100 Gigabit Ethernet (GE) client via a network based on 100GE), the PLE protocol may split traffic across multiple smaller capacity paths so that the split traffic sub-flows can each individually be routed more easily through the service provider network.

DETAILED DESCRIPTION

Overview

In one embodiment, a method is provided to compensate for differential delay among a plurality of paths between first and second nodes in a network. The method may involve measuring delay for each of the plurality of paths for a plurality of sub-flows transmitted between the first node and the second node on respective paths of the plurality of paths. The plurality of sub-flows are obtained by splitting a traffic flow. The method involves determining delay differences among the plurality of paths, and adjusting, based on the delay differences, a queue delay associated with a respective flow of the plurality of sub-flows on one or more of the plurality of paths to achieve a path delay that is equal to a target path delay for each of the plurality of paths.

Example Embodiments

Figure 1A:
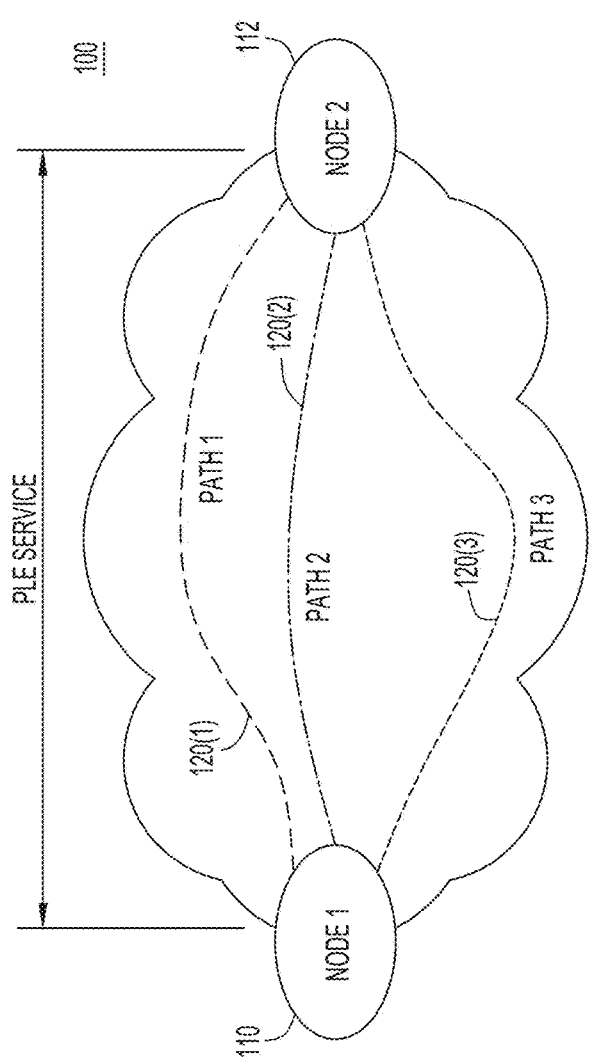
FIG. 1A illustrates a simplified network that employs Private Line Emulation (PLE) and in which a high-bandwidth stream is split into multiple sub-flows sent over multiple paths between PLE nodes.

With reference first to FIG. 1A, a simplified network 100 is shown that uses Private Line Emulation (PLE) to emulate a point-to-point connection, e.g., from node 1 (shown at reference numeral 110) to node 2 (shown at reference numeral 112). If the interface is 100 G, then a constant stream of 100 G of data is generated (plus some overhead, so actually 110 G of data). Predominantly, networks are built to support at most 100 G links between routers. For this reason, it can be advantageous to split a traffic flow over a connection into multiple sub-flows. Each of the multiple sub-flows, each less than 100 G, is steered along different paths between the two endpoints. These paths are shown at 120(1), 120(2) and 120(3) in FIG. 1A. It should be understood that 100 G is only one example, and the techniques presented herein are applicable to various future networking standards and foreseen bandwidths, such as when network links are capable of supporting 400 G, and a traffic flow may be 400 G, 800 G or 1.6 T.

Per packet load balancing of PLE packets along those different paths can lead to out of sequence delivery of PLE packets as each path may have a different propagation delay. PLE can reorder packets inside a de-jitter buffer of a node (e.g., Node 2) based on a sequence counter in the PLE header of the packets. The de-jitter buffer is large enough to buffer packets in order to re-shuffle them into the correct order. This can make for higher cost as the memory for the de-jitter buffer is expensive.

Figure 1B:
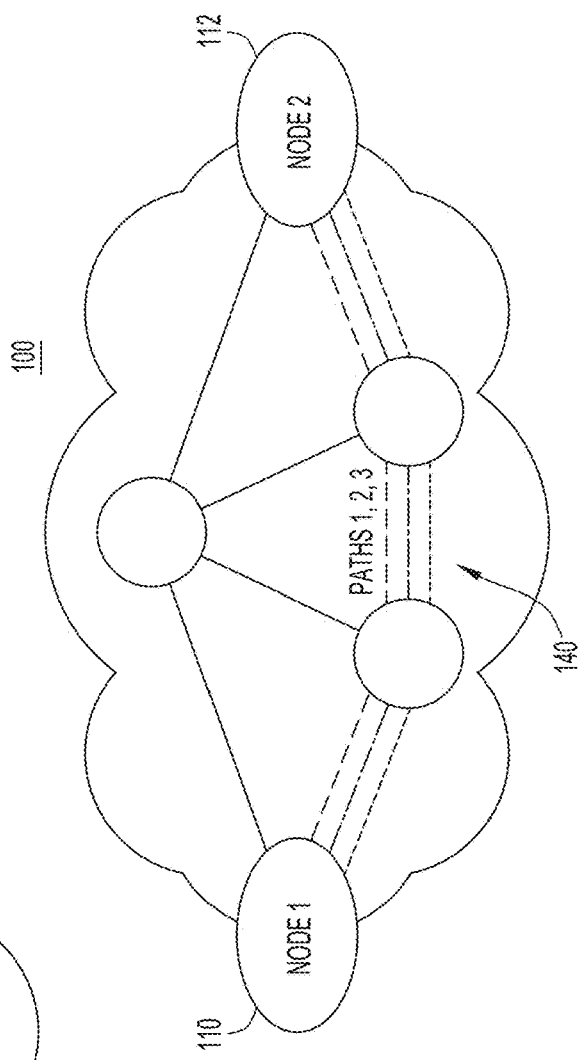
FIG. 1B illustrates a network, similar to FIG. 1A, but in which a common set of paths are used for multiple sub-flows between PLE nodes.

Generally, the de-jitter buffer memory size of an emulation engine running inside a node is limited to a few hundred microseconds (pee). The delay through a network is largely driven by the propagation delay in optical fiber which could easily lead to path delay differences of several milliseconds (msec). Thus, to avoid hitting the de-jitter buffer limitation (and thus still be able to deal with out-of-order sequencing) a PLE implementation would restrict the routing of paths to use parallel links (between the two endpoints) along the same set of node-to-node fiber connections. This is shown in FIG. 1B and the same set of node-to-node fiber connections is shown at reference numeral 140. Such routing constraints are very restricted for an actual network deployment.

Figure 2:
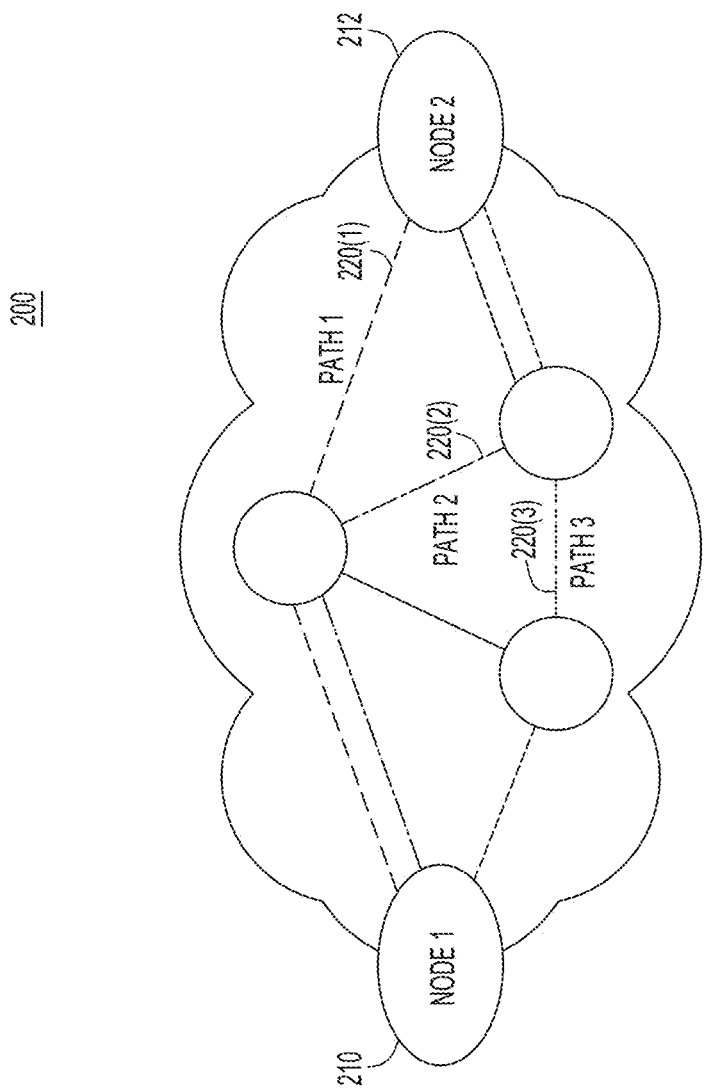
FIG. 2 is a network, similar to FIGS. 1A and 1B, but in which sub-flows of a traffic flow are sent along multiple paths between nodes, with no constraint that the multiple paths be the same, using the techniques presented herein.

Presented herein are techniques that remove the aforementioned routing restriction, allowing a network operator the freedom to use any path across the network and still allow for an implementation that does not require expensive memory and silicon technology for a very large de-jitter buffer. This is depicted in FIG. 2, wherein in the simplified network 200, sub-flows of a traffic flow between node 1 and node 2, shown at reference numerals 210 and 212, can be sent along different paths shown at reference numerals 220(1), 220(2) and 220(3).

The foundation for PLE is a packet network that consists of routers (nodes) containing Network Processing Units (NPUs). NPUs are general-purpose packet processors that can modify network datagrams. NPUs inside routers generally have a traffic manager block that has a large buffer memory. The techniques presented herein leverage this memory to accommodate the large differential delay (skew) observed by PLE packets traversing across the multiple paths, e.g., paths 220(1), 220(2) and 220(3), that are freely routed through the network 200.

Typically in a router, buffer memory is connected to either the ingress or egress port of the NPU and queues are instantiated per traffic class. A queue control mechanism running on the NPU generally is scheduling packets based on available port or service class bandwidth to avoid or manage congestion. In addition, traffic shaping capabilities are also available that allow to limit packet transmission to stay below a desired average rate. Packets that cannot be sent right away are stored in the buffer memory until they can be sent to achieve the target traffic rate.

The techniques presented herein involve measuring the delay per path and delay differences among paths in a PLE engine of an egress node, determining a target path delay and adjusting each queue delay to align path delays to the target path delay.

The techniques presented herein are not limited to PLE, and could be used for any transport mechanism that has sequence numbers in the packets in order to allow for determining whether the packets are delivered out of order. Another example use of these techniques is for Ethernet Virtual Private Wire Service (VPWS), where per packet load-balancing and re-assembly may be implemented in a processing device, such as a field programming gate array (FPGA) or the NPU itself.

Figure 3:
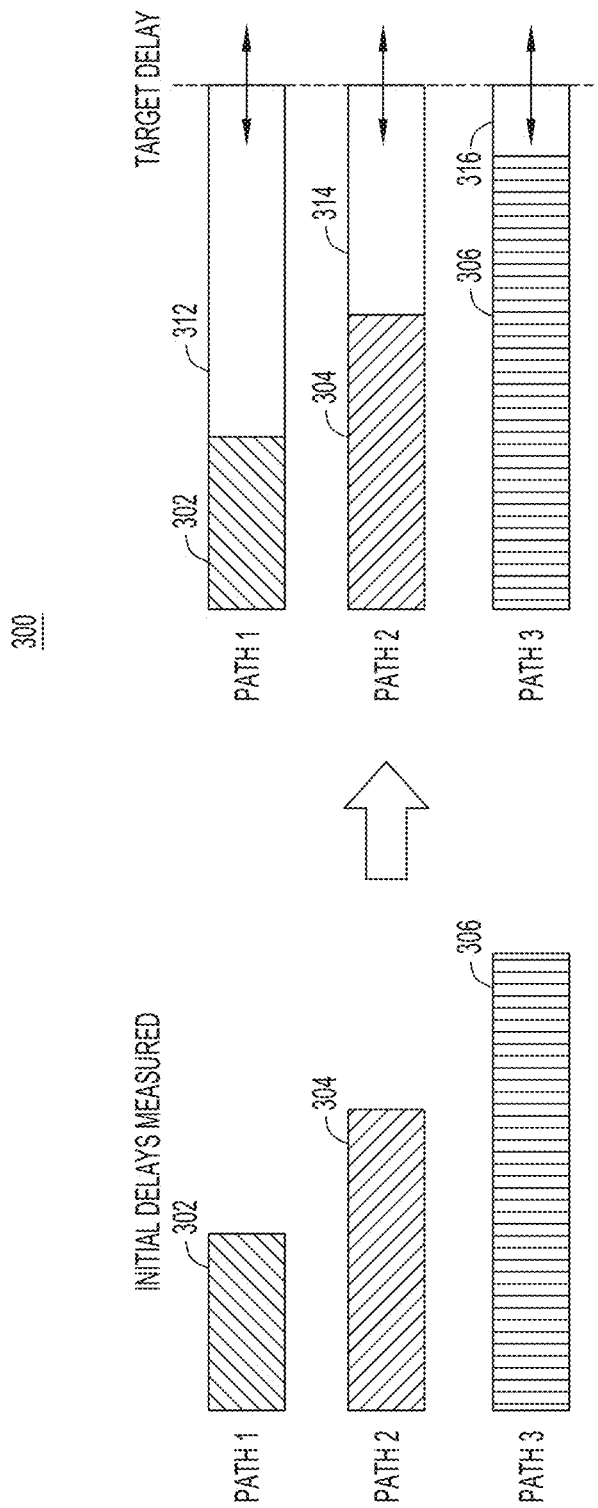
FIG. 3 illustrates how a delay may be introduced for one or more of the multiple paths in order to achieve a common target delay among the plurality of paths, according to an example embodiment.

Reference is now made to FIG. 3 for an illustration 300 of this in concept. FIG. 3 shows initial delays measured for each path, shown at 302, 304 and 306. Rather than buffering all of the packets from each path in the de-jitter buffer of egress node (node 2 in FIG. 2), which is expensive (in terms of buffer memory requirements), a delay is introduced per path buffer queue using the packet shaping/scheduling mechanism already executed in the packet processor of a node. This could be done at node 2, node 1 or even at an intermediate node between nodes 1 and 2. As shown FIG. 3, the target path delay is equal to or greater than the maximum measured path delay. A different delay amount is introduced for a given path in order to result in a total delay that is equal to the target delay. Thus, as shown in FIG. 3, the measured delay 302 for path 1 is smaller compared to the measured delay 304 for path 2 and the measured delay 306 for path 3. Thus, a delay 312 is applied for path 1, a delay 314 is applied for path 2 and a delay 316 is applied for path 3. Delay 312 is longer than delay 314 which in turn is longer than delay 316, but the result is that the total or overall delay for each of paths 1, 2 and 3 will be equal to the target delay as shown in FIG. 3. As depicted in FIG. 3, a queue is assigned to each path inside the NPU of a node.

Achieving a desired queue delay may be implemented in many ways, potentially even by a native function of a future-developed NPU. Using available functions on currently available NPUs, a queue delay could be implemented as follows.

Figure 4:
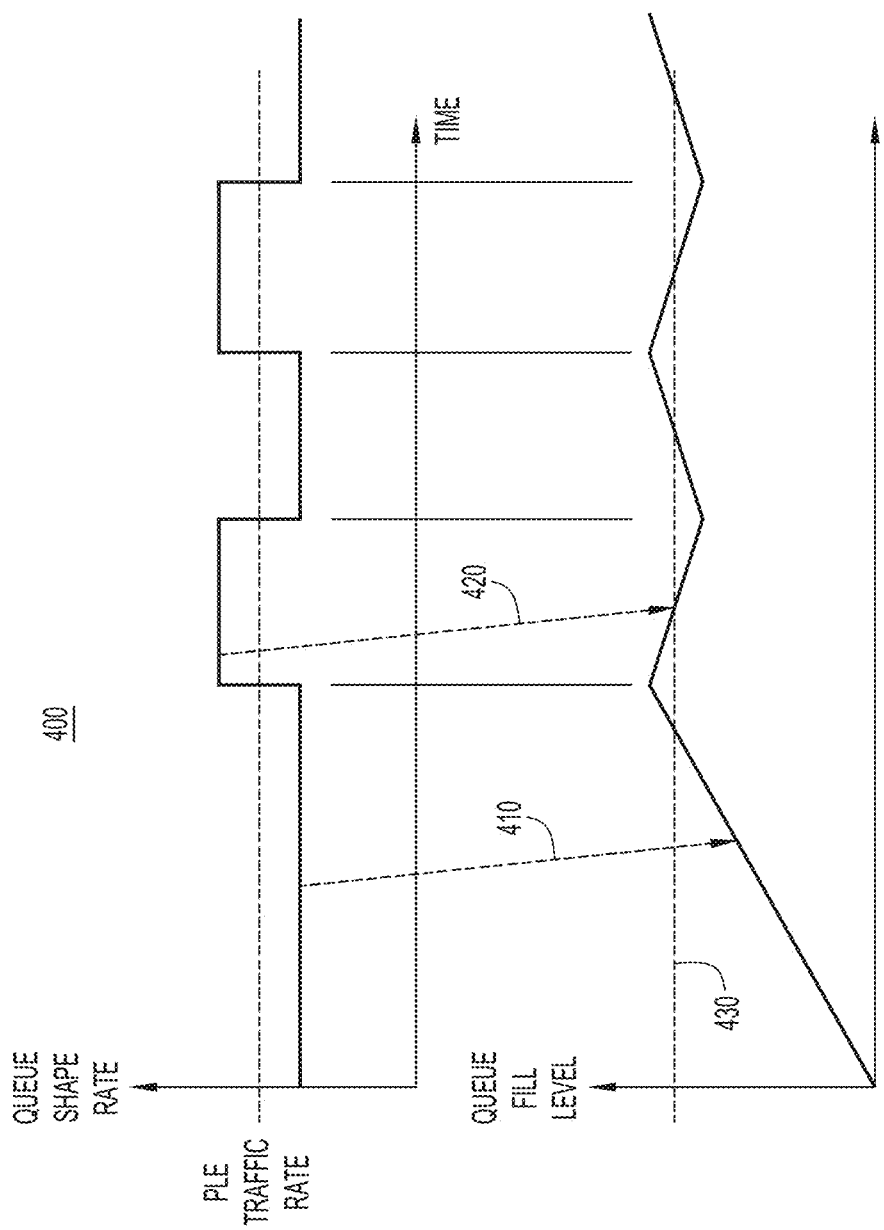
FIG. 4 is a diagram illustrating a relationship between queue shape rate and queue fill level, which relationship is used in a node to delay packets to achieve the common target delay among the plurality of paths, according to an example embodiment.

Reference is made to FIG. 4, which shows plots 400 depicting the relationship between the queue shape rate and the queue fill level. This relationship can be used to delay packets in an NP using a queue shaping mechanism. A queue is filling up if more packets are assigned to the queue than are scheduled out of the queue. The rate of packets assigned to a queue is the rate of PLE packets that are assigned to the respective path. The rate of packets taken out of the queue is determined by the traffic shape rate configured for that queue. The fill level of a queue determines the delay introduced to packets serviced by this queue, where:

$$\text{Packet\_delay [msec]} = \text{queue level [Bytes]} * 8 / \text{shape rate [Mbps]}$$

For some PLE implementations, there is a Field Programmable Gate Array (FPGA) that has a de-jitter buffer. The solution presented herein allows for use of a di jitter that is relatively small, and a function is offloaded to the queues of the NPU to control how packets are put into the queue. By setting the queue shape rate to be smaller than the PLE traffic rate the queue buffer will fill up over time. This is shown at 410 in FIG. 4. When the queue fills up, this means that every packet has to wait in line behind a certain number of packets, and this therefore introduces a certain delay. By setting a queue shape rate below the PLE traffic rate, this causes the queue to fill faster than it can empty it, so the queue fills up and a delay is introduced. A queue shape rate greater than the PLE traffic rate will make the queue fill level decrease, as shown at 420, meaning that the queue is going to be emptied faster than the queue is filled, removing delay. Periodic shape rate changes will make the fill level remain close to a target fill level 430. Thus, by using known queue rate shaping mechanisms that are available in NPUs, it is possible to use the NPU to achieve a target delay in any of the sub-flows.

Such a mechanism may allow to reduce the delay differences between parallel paths through a network from a msec range down to a microsec range which can easily be compensated within an egress PLE engine's de-jitter buffer.

Figure 5A:
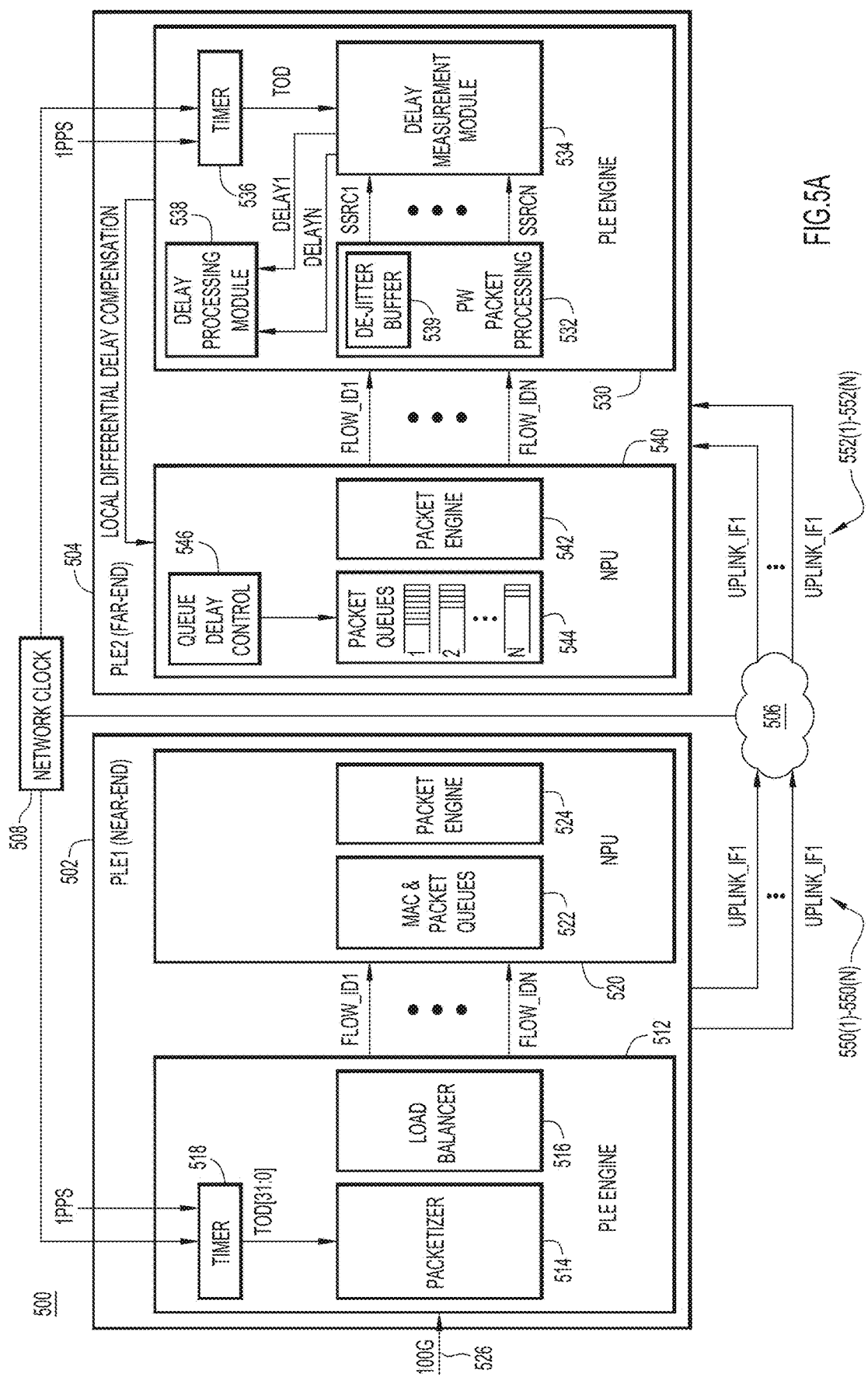
FIG. 5A is a diagram depicting a communication system comprising first and second nodes in communication with each other in which differential delay compensation is employed at the second node that receives a plurality of sub-flows from the first node, according to an example embodiment.

Reference is now made to FIG. 5A. FIG. 5A shows a simplified communication system 500 with two nodes 502 and 504 in communication with each other via a packet switched network 506. Node 502 may arbitrarily be referred to as a near-end node, denoted PLE1, and node 504 is thus referred to as a far-end node, denoted PLE2. Node 502 is sending traffic to node 504. Each node includes a PLE engine and an NPU. There is a network clock 508 to which node 502 and node 504 are synchronized.

Node 502 includes a PLE engine 512 that has a packetizer 514, a load balancer 516 and a timer 518 synchronized to network clock 508, as well as an NPU 520 that includes a MAC & plurality of packet queues 522 and packet engine 524. Node 502 further includes a port 526 at which traffic is received by node 502.

Node 504 includes a PLE engine 530 and NPU 540. In the arrangement of communication system 500 shown in FIG. 5A, node 504 is the far-end node and it is performing local differential delay compensation. Thus, as shown in FIG. 5A, the PLE engine 530 includes PW packet processing (packet engine) 532, a delay measurement module 534, a timer 536 and a delay processing module 538. The NPU 540 includes a packet engine 542, a plurality of packet queues 544 and queue delay control module 546. In addition, the PW packet processing (packet engine) 532 includes a de-jitter buffer 539.

The node 502 receives at port 526, 100 G client traffic. For example, the client traffic may be 100 G Ethernet (GE) traffic or Optical Channel Data Unit 4 (ODU4), etc. Inside the PLE engine 512 of node 502, the packetizer 514 packetizes the client traffic bit transparently into an elephant pseudowire (PW) by inserting a sequence number to retrieve the packet order, Real-time Transport Protocol (RTP) timestamp is inserted into an RTP header to retrieve the source client clock and a 32-bit synchronization source (SSRC) field in the RTP header is embedded with a Time of the Day (ToD) for delay measurement. Such elephant PW traffic carries flow identifier (Flow_id) information in a Multiprotocol Label Switching (MPLS) label field to indicate which uplink interface is used to carry the elephant PW traffic over packet switched network. The load balancer 516 equally distributes the PW packets into each Flow_id1 to Flow_idN, where N is number of uplink interfaces 550(1)-550(N) used to carry this traffic. The PW traffic (with Flow_id1 to Flow_idN) generated in node 502 is provided to NPU 520 to transport the same over the N uplink interfaces 550(1)-550(N).

Node 504 receives the elephant PW traffic with Flow_id1 to Flow_idN from the N uplink ports 552(1)-552(N). The NPU 540 in node 504 schedules this received traffic to PLE engine 530. The PW packet processing module 532 in node 504 retrieves the sequence number from received elephant PW traffic in the order the packets are received. If sequence numbers are not in order, the PW packet processing module 532 re-orders the packets so that client the traffic is retrieved without any error or corruption. The re-ordering can be done only for the packets whose sequence number fall within support of size of the de-jitter buffer 539. If the out of ordered packet has a sequence number outside the size of the de-jitter buffer 539, then this packet cannot be handled and it results in loss or corrupted retrieved client traffic.

The elephant PW packets received from N different uplink paths, if all of them had equal transport delay or with a differential delay and packet delay variation (PDV) less than supported by a de-jitter buffer, then out of ordered packets can be re-ordered. If the received elephant PW traffic from N different paths have asymmetry in transport delay or the differential delay and PDV exceed the supported de-jitter buffer size, then managing re-ordered packets is not feasible.

It is important to compensate for the differential delay between uplink paths in order reduce the demand for de-jitter buffer size in the PLE engine 530. The techniques presented herein use ingress or egress queues present in an NPU to compensate for the differential delay.

As shown in FIG. 5A, nodes 502 and 504 may be frequency synchronized and the ToD is updated for every one pulse per second (1PPS) to timer 518 of node 502 and to timer 536 of node 504. Frequency synchronization may be achieved using any of a variety of technologies, including, for example, Synchronous Ethernet (SyncE), Precision Time Protocol (PTP) or Building Integrated Timing System (BITS).

The PW packet processing module 532 in node 504 extracts the SSRC field from the RTP header which carries the ToD for each PW packet (remote ToD) and also at the same time ticks a local ToD with respect to the timer 536. The delay measurement module 534 uses the extracted ToD information (remote and local) and Flow_id1 to Flow_idN to calculate the one-way delay incurred between node 502 to 504 for each uplink path, and this is denoted as delay1 to delayN. This calculated one-way delay information is further processed to nullify the variation in calculated delay for PDV and burst traffic. The delay processing module 538 computes the differential delay for each path by taking the difference between an average delay and the delay of each path. This differential delay for each path can be compensated locally (at local NPU 540 of node 504) or by a NPU of the remote node (node 502).

Figure 5B:
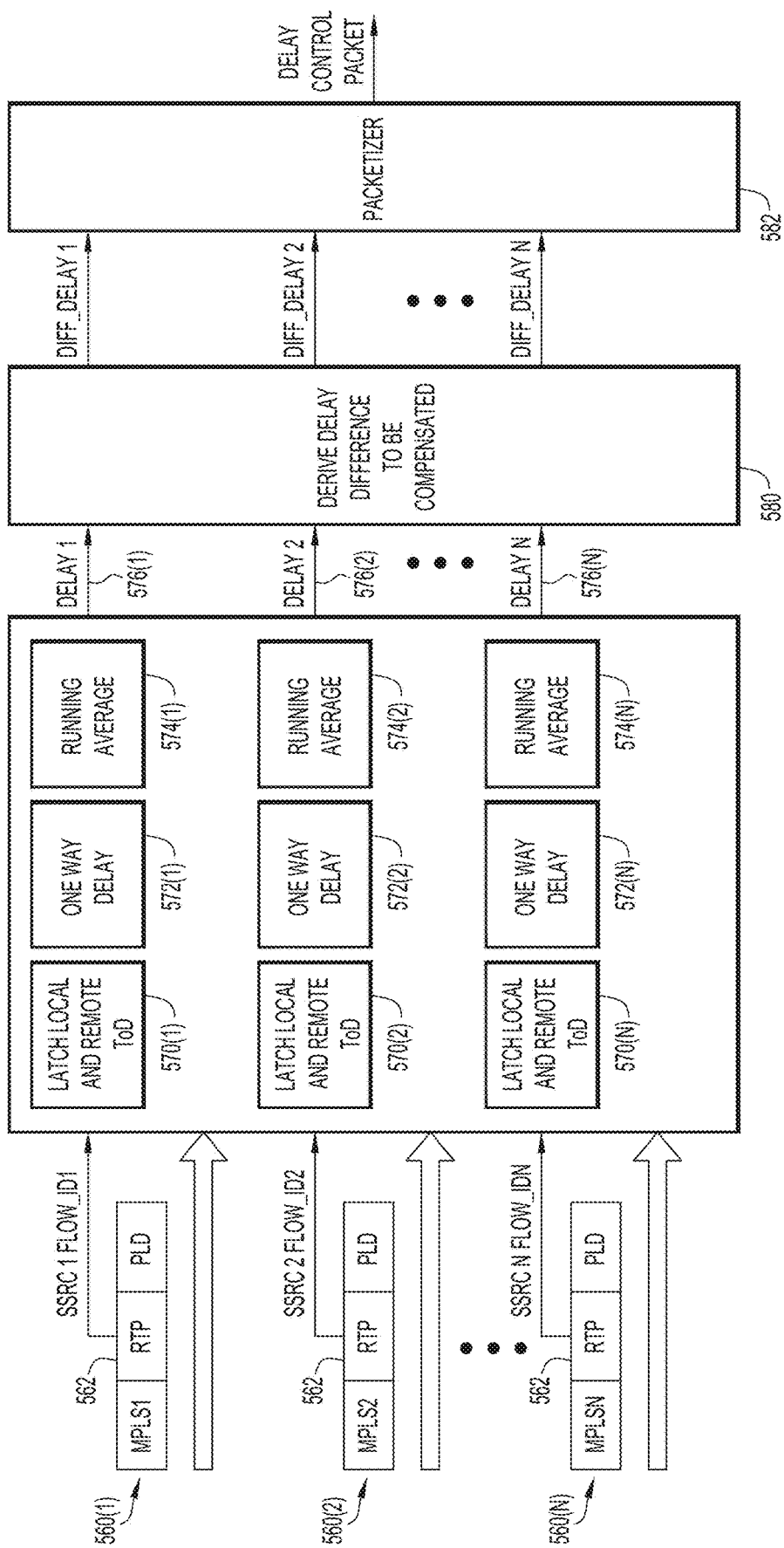
FIG. 5B is a diagram depicting delay processing operations performed at the second node in the system of FIG. 5A, according to an example embodiment.

Reference is now made to FIG. 5B, with continued reference to FIG. 5A. FIG. 5B illustrates a process performed by the delay measurement module 534 and delay processing module 538 in PLE engine 530 of node 504 to derive the differential delay for each uplink path. The PW packet processing module 532 of the PLE engine 530 in node 504 processes the PW packets 560(1)-560(N) received from the NPU 540 and extracts the SSRC field from the RTP header 562 of each of the packets 560(1)-560(N). The SSRC field carries the remote ToD information. Once the delay processing module 538 receives the remote ToD, it ticks the local ToD. The remote and local ToDs, shown at 570(1)-570(N), are latched into memory (saved) and used to derive the one-way delay 572(1)-572(N) for each uplink path. The calculated one-way delay for each uplink path is averaged at 574(1)-574(N) over a period of time so that the PDV and burst effect present in PW traffic received from the NPU is nullified. Because of PDV and burst traffic, for a given uplink path the measured one-way delay between two packets would differ and the variation in measured one-way delay for each uplink path cannot be used to compensate the differential delay compensation as it may result to over- or under-compensation. The variations in measured one-way delay for each uplink path can be nullified by averaging the delay over period of time, so that the final one-way delay 576(1)-576(N) is more realistic, and has less variations.

The one way delay for Flow_id1 (uplink path 1):

$$delay1 = \text{average (remote ToD1} - \text{local ToD'1)}.$$

The one way delay for Flow_idN (uplink path N):

$$delayN = \text{average (remote ToDN} - \text{local ToD'}N).$$

At 580, a delay difference to be compensated, for each path is computed as follows. A mean one-way delay of all the uplink paths is computed as:

$$\text{max delay} = \max(delay1, \ldots delayN).$$

The differential delay for Flow_id1 (uplink path 1) is computed:

$$\text{diff\_delay1} = \text{max delay} - delay1.$$

The differential delay for Flow_idN (uplink path N) is computed:

$$\text{diff\_delay}N = \text{max delay} - delayN.$$

For an uplink path for which the derived differential delay is zero, there is no delay compensation needed for that uplink path. For an uplink path for which the derived differential delay value is positive, the uplink path is covering a shorter distance compared to the uplink path with the maximum measured delay.

During an initialization phase, the target path delay is selected based on the measured maximum path delay. Once the target path delay is known, the desired queue delay to align each path to the target is calculated and programmed.

Alternatively, if PLE1 and PLE2 are not time synchronized the target path delay algorithm can determine average path delay differences leveraging PLE sequence numbers and local arrival time and select target path delays to null/compensate the delay differences observed. Further, path delay measurements are used to compensate any slow variation and difference from the target path delay.

Local Differential Delay Compensation

In one embodiment, the delay difference calculation and compensation are happening in the same node, hence the approach is called local delay compensation. That is, the derived differential delay for each uplink path (diff_delay1 to diff_delayN) is presented to local software for local delay compensation of the differential delay. Referring back to FIG. 5A, the derived difference for each path is used to adjust the queue delay in the NPU 540 of node 504. Queue delay control module 546 (software) of the NPU 540 obtains the local differential delay compensation information from the delay processing module 538 of the PLE engine 530 and configures the plurality of packet queues 544 of NPU 540. When the resulted differential delay for a path is zero then no change in queue delay is needed for that path. When the differential delay value for a path has a positive value then, this means it is a shorter path and the queue delay control module 546 increases the queue delay to compensate for the differential delay.

Remote Differential Delay Compensation

Figure 5C:
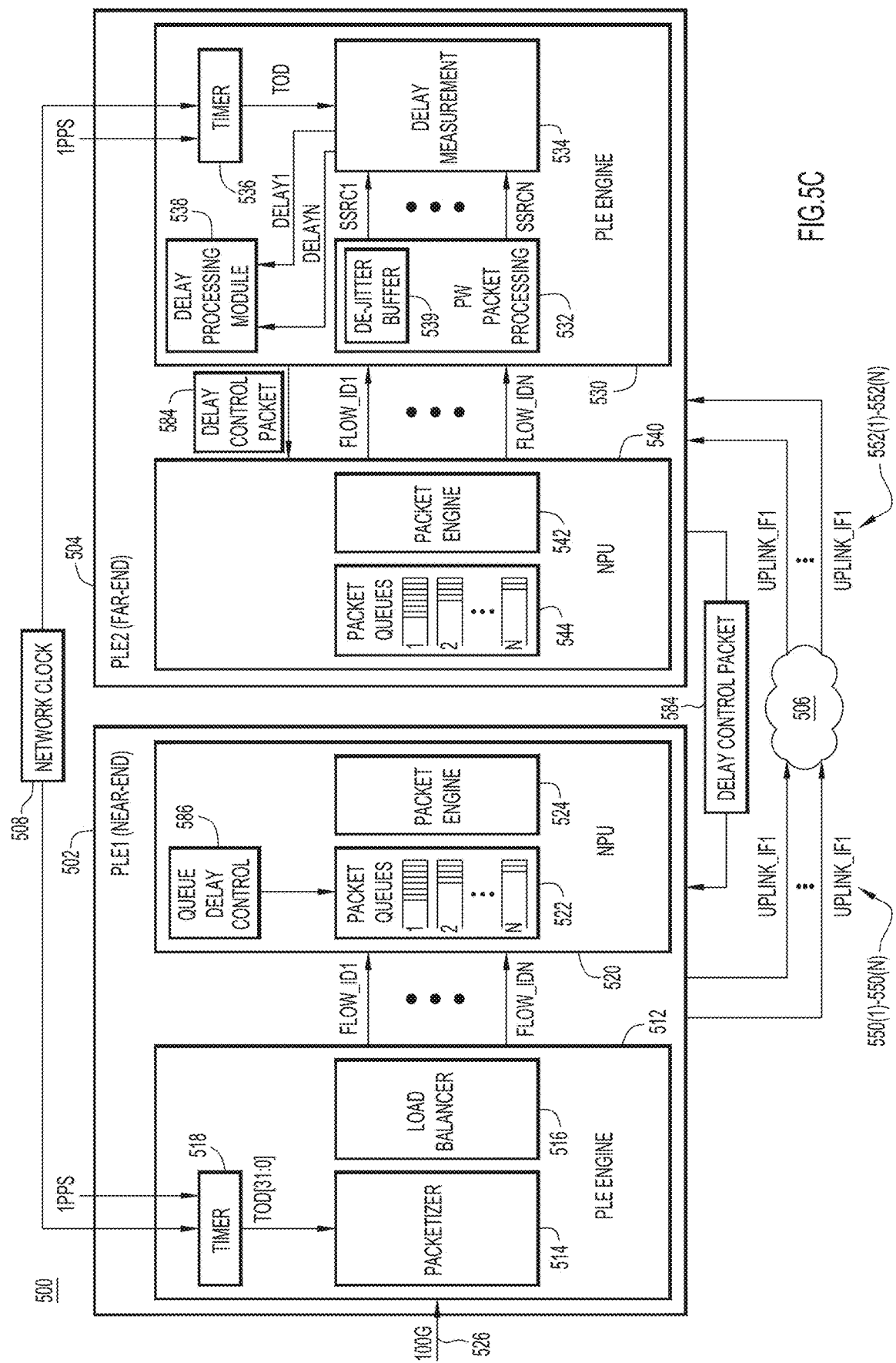
FIG. 5C is a diagram of the communication system similar to FIG. 5A, but in which differential delay compensation performed at the first node based on differential delay information sent by the second node in a delay control packet to the first node, according to an example embodiment.

Reference is now made to FIG. 5C, with continued reference to FIG. 5B. FIG. 5C shows the nodes 502 and 504 in a configuration in which the delay processing module 538 of node 504 includes a packetizer 582 that generates a delay control packet 584 that carries the derived differential delay for each uplink path (diff_delay1 to diff_delayN). The delay processing module 538 provides the delay control packet 584 to the NPU 540 that transports the delay control packet 584, along with PW traffic, over the packet switched network 506 to node 502.

The NPU 520 of the node 502 decodes the delay control packet 584. The NPU 520 includes a queue delay control module 586 that configures the plurality of packet queues 522 to compensate for the differential delay for each path. The plurality of packet queues 522 include a queue for each of the paths 1-N. If the differential delay for a path is zero, then no change in queue delay for that path is needed. If the differential delay value for a path has a positive value, this means it is a shorter path and the queue delay control module 586 increases the queue delay for that path to compensate the differential delay.

Figure 5D:
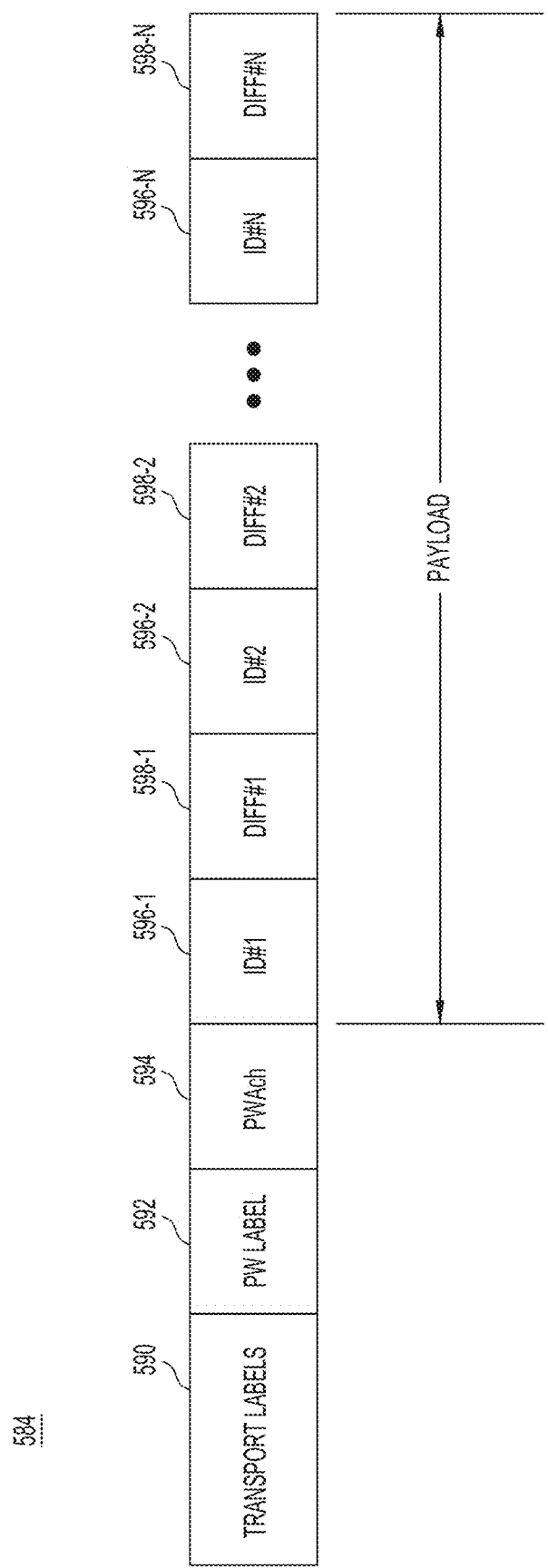
FIG. 5D is a diagram showing an example structure of the delay control packet referred to in FIG. 5C, according to an example embodiment.

Reference is now made to FIG. 5D, which shows an example arrangement of the delay control packet. The delay control packet 584 carries the differential delay for each uplink path and Flow_id information in a MPLS label to indicate, as payload, the differential delay for a given which uplink path. Thus, the delay control packet 584 includes a transport labels field 590, a PW label field 592, a PW associating channel header (PWAch) field 594, and a payload that includes identifier subfields 596-1 to 596-N each of which identifies a particular path and differential delay subfields 598-1 to 598-N each of which carries the differential delay value for a particular path. The PWAch field 594 allows for sending the delay control packet 584 via the PLE pseudowire and distinguishing the delay control packet 584 from PW packets carrying the client traffic.

As depicted in FIGS. 5A-5D, the techniques presented herein involve compensating for the skew between multiple uplink paths used to carry traffic, e.g., elephant PW traffic, by using the ingress or egress buffers of an NPU in a node, thereby reducing the need for larger de-jitter buffer a node.

The PLE engine of node 502 packetizes the client traffic bit transparently into PW packets. A control word in the PW packet header includes a sequence number to retrieve the packet order at node 504. In order for the PLE engine of node 504 to be able to calculate the one-way delay of a path, the RTP header in the PW packet includes ToD information indicating when the packet was created by node 502 for transmission to node 504.

For PLE pseudowires of high capacity, the PLE engine distributes packets across multiple traffic engineered paths through the packet network. The packets are distributed in an equal or weighted round robin fashion, depending on the path bandwidth requirements to satisfy the total PLE pseudowire bandwidth. Packets are sent with a unique flow identifier (Flow_id) per path. This flow identifier may be encoded inside the PLE PW header (control word or RTP header) or represented by adding another header such as an MPLS label that stays in the packet all the way to the far-end PLE engine in node 504.

Node 504 receives the PW traffic via multiple paths and forwards the received traffic to the PLE engine 530 in node 504. The PLE engine 530 retrieves the sequence number in the order the packets are received. If sequence numbers are not in order, the PLE engine 530 does re-ordering so that the client traffic is decapsulated without any error or corruption. As explained above, the re-ordering can be done only for the packets whose sequence number range falls within support of the de-jitter buffer 539. If the received out of ordered packet has a sequence number outside the supported size of the de-jitter buffer 539, then such packet cannot be handled, has to be dropped and it results in corrupted client traffic.

When multiple paths are used to carry high capacity PLE PW traffic, the sum of the maximum differential delay among paths and packet delay variation is maintained within the de-jitter buffer capacity. Otherwise, re-ordering of packets is not possible and the client traffic will be corrupted. The techniques presented herein leverage a NPU queue adjustment mechanism to artificially delay packets to stay within the limit of the de-jitter buffer 539 when packets arrive at the PLE engine in PLE2. In other words, these techniques involve delaying packets associated with queues that are stored in a memory of an NPU one of the nodes (or an intermediate node), as opposed to packets stored in de-jitter buffer 539 where packet re-assembly and re-ordering occurs.

Figure 6:
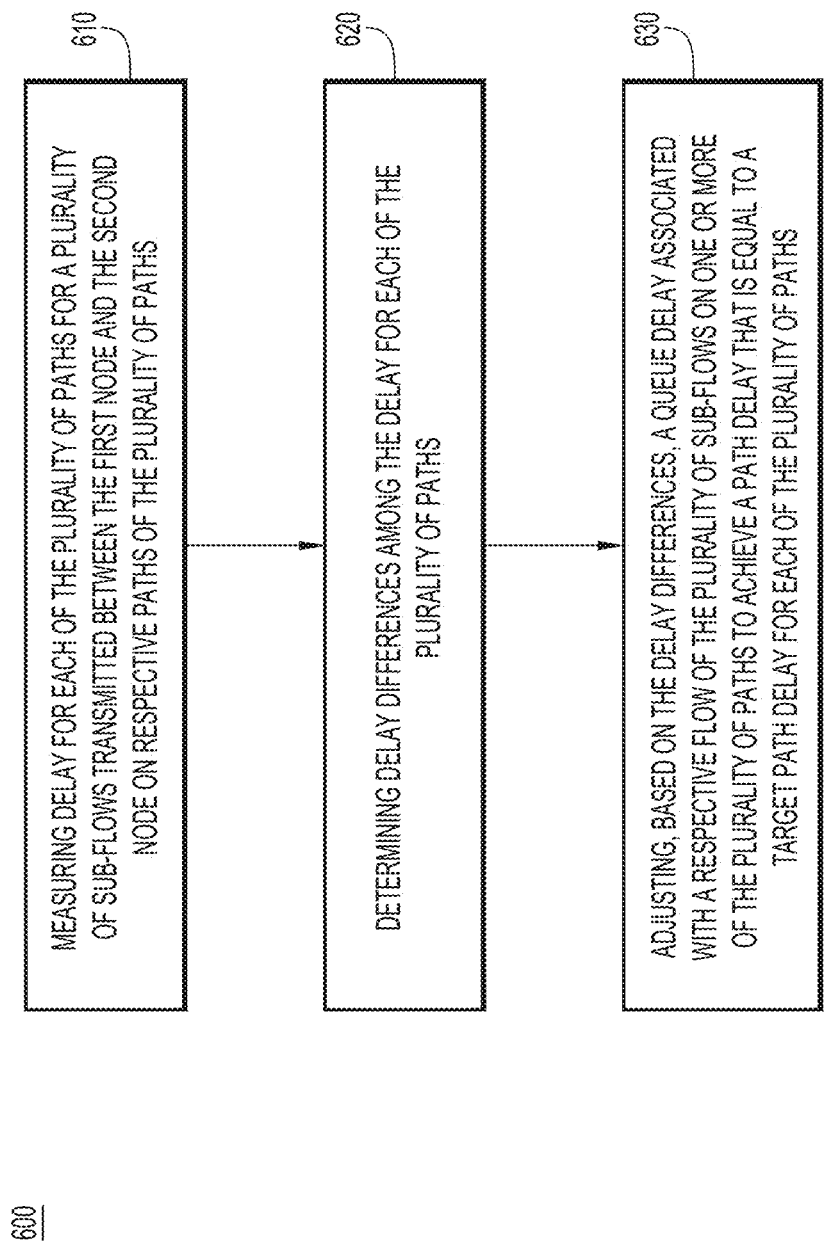
FIG. 6 is a flow chart depicting a method to compensate for differential delay between multiple paths between first and second nodes, according to an example embodiment.

Reference is now made to FIG. 6, which depicts a method 600 for compensating for differential delay among a plurality of paths used to transmit a corresponding plurality of sub-flows (derived by splitting a traffic flow) between first and second nodes in a network. The method 600 involves, At step 610, measuring delay for each of the plurality of paths for a plurality of sub-flows transmitted between the first node and the second node on respective paths of the plurality of paths. The plurality of sub-flows are obtained by splitting a traffic flow. At step 620, the method 600 involves determining delay differences among the delay for each of the plurality of paths. At step 630, the method involves adjusting, based on the delay differences, a queue delay associated with a respective flow of the plurality of sub-flows on one or more of the plurality of paths to achieve a path delay that is equal to a target path delay for each of the plurality of paths.

As described above, the measuring at step 610 may be performed at the second node and the adjusting step 630 may be performed at the first node, at the second node, or at an intermediate node between the first node and the second node.

In one example, the traffic flow may be a PLE traffic flow that is divided across the plurality of paths through intermediate network devices and such that there is no restriction that the plurality of paths be the same.

In summary, a method is provided to compensate for differential delay between multiple paths between first and second nodes, such as for example, to carry a high capacity PLE pseudowire in a manner that allows for reducing the need for a larger and more expensive de-jitter buffer in a PLE engine. The method involves estimation of per path latency skew (differential delay), whereas in prior systems only measurement of delay of a single entire path was made. Differential delay compensation may be achieved using NPU queue memory instead of an emulation engine de-jitter buffer memory. As part of these techniques, a scheme is provided to control delay introduced by queue memory of an NPU in a node, as well as a method to instruct a remote node's NPU to compensate for delay. Distributed differential delay compensation may be performed using NPU queue memory on a remote node (sending node) instead of on the local node (receiving node), as depicted in FIG. 5C.

A similar mechanism can be implemented for compensate for delay differences at any intermediate node.

Figure 7:
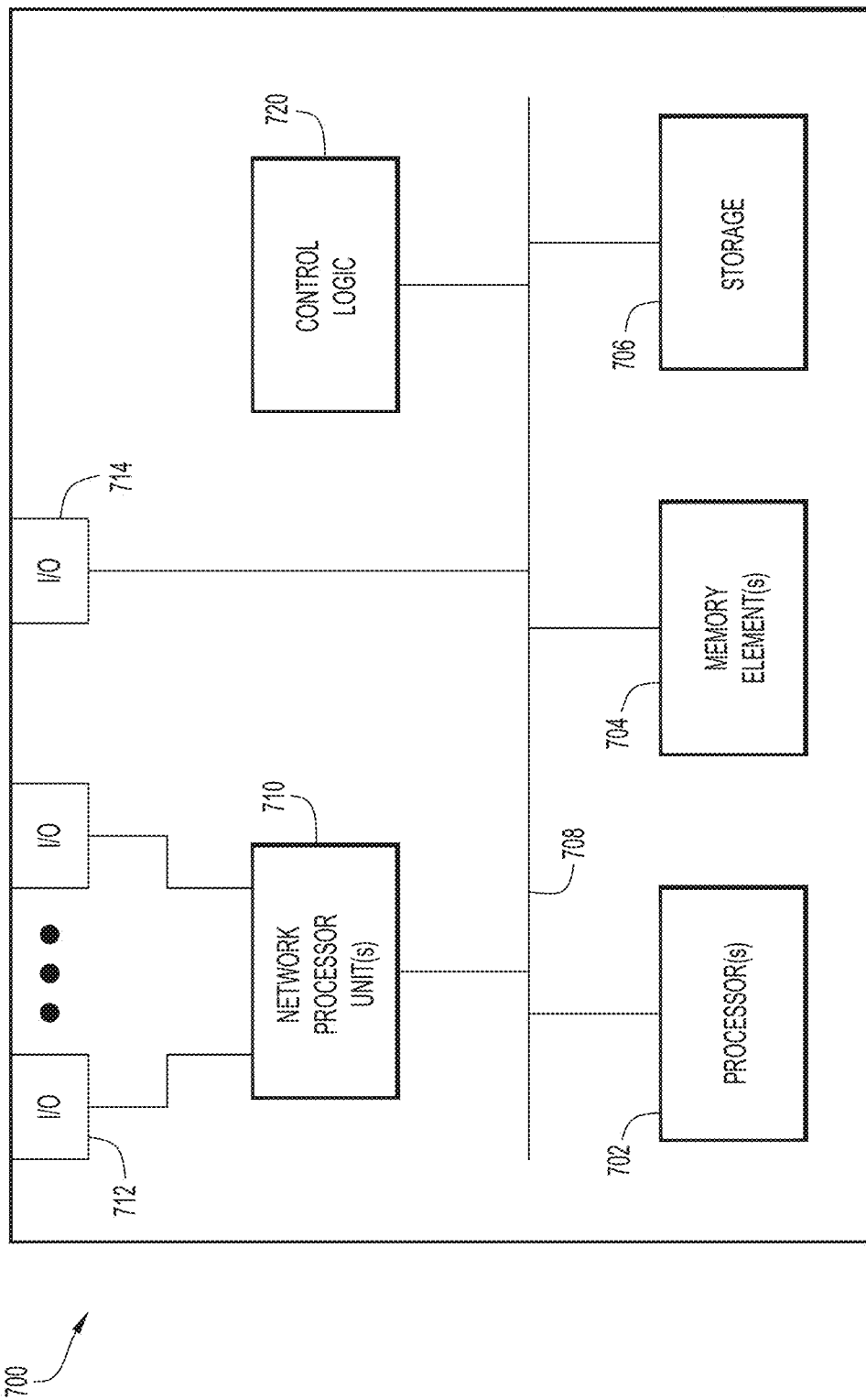
FIG. 7 is a hardware block diagram of a device that may be configured to perform the operations involved in the techniques presented herein, according to an example embodiment.

Referring to FIG. 7, FIG. 7 illustrates a hardware block diagram of a device 700 that may perform functions of a device associated with operations discussed herein in connection with the techniques depicted in FIGS. 1-6. In various embodiments, device 700 may be configured as any devices as discussed for the techniques depicted in connection with FIGS. 1-6 in order to perform operations of the various techniques discussed herein. The device 700 may be any networking device that can be configured to perform the operations presented herein, such as a router, e.g., a PLE node.

In at least one embodiment, the device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, mouse, display, a touch screen display, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the device 700 serves as a user device as described herein.

In various embodiments, control logic 720 can include instructions that, when executed, cause processor(s) 702 to perform operations, which can include, but not be limited to, providing overall control operations of device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

In some aspects, the techniques described herein relate to a method to compensate for differential delay among a plurality of paths between a first node and a second node in a network, the method including: measuring delay for each of the plurality of paths for a plurality of sub-flows transmitted between the first node and the second node on respective paths of the plurality of paths, wherein the plurality of sub-flows are obtained by splitting a traffic flow; determining delay differences among the delay for each of the plurality of paths; and adjusting, based on the delay differences, a queue delay associated with a respective flow of the plurality of sub-flows on one or more of the plurality of paths to achieve a path delay that is equal to a target path delay for each of the plurality of paths.

In some aspects, the techniques described herein relate to a method, wherein adjusting is performed at the first node, at the second node or at an intermediate node between the first node and the second node.

In some aspects, the techniques described herein relate to a method, wherein adjusting includes adjusting queue delay of packets associated with the respective flow that are stored in a memory of a network processor unit of the first node, the second node or the intermediate node.

In some aspects, the techniques described herein relate to a method, wherein the first node and the second node are synchronized, and wherein measuring delay includes the second node: extracting from a packet for each sub-flow of the plurality of sub-flows, a time of transmission of the packet from the first node; determining a time of arrival at the second node of the packet for each sub-flow of the plurality of sub-flows; and computing a one-way delay for each of the plurality of paths based on a time difference between the time of transmission and the time of arrival of the packet for each sub-flow of the plurality of sub-flows.

In some aspects, the techniques described herein relate to a method, further including: determining a maximum path delay among the one-way delay for each of the plurality of paths; and selecting the target path delay based on the maximum path delay.

In some aspects, the techniques described herein relate to a method, wherein adjusting includes the second node: adjusting, at the second node, a delay in a packet queue into which received packets are queued for the respective path of the plurality of paths based on the delay difference for the respective path.

In some aspects, the techniques described herein relate to a method, wherein the determining delay differences is performed at the second node, and further including: transmitting the delay differences in a delay control packet to the first node; wherein adjusting includes adjusting, at the first node, a delay in a packet queue from which packets for the plurality of sub-flows are queued for transmission from the first node to the second node.

In some aspects, the techniques described herein relate to a method, wherein the first node and the second node are not synchronized, and wherein determining delay differences includes: determining average path delay differences using sequence numbers of packets of the plurality of sub-flows and times of arrival of packets of the plurality of sub-flows, and selecting target path delays to compensate for the delay differences.

In some aspects, the techniques described herein relate to an apparatus including: a plurality of interfaces at which a respective sub-flow of a plurality of sub-flows transmitted by a first node are received at a second node via respective paths of a plurality of paths between the first node and the second node, wherein the plurality of sub-flows are obtained by splitting a traffic flow; a plurality of packet queues configured to queue a respective sub-flow of the plurality of sub-flows; and a processor configured to execute instructions which cause the processor to perform operations including: measuring delay for each of the plurality of paths; and determining delay differences among the delay for each of the plurality of paths, from which a queue delay associated with a respective flow of the plurality of sub-flows on one or more of the plurality of paths is made to achieve a path delay that is equal to a target path delay for each of the plurality of paths.

In some aspects, the processor executes instructions that cause the processor to perform: generating a queue delay associated with a respective flow of the plurality of sub-flows on one or more of the plurality of paths, wherein the plurality of packet queues use the queue delay associated with each respective flow of the plurality of sub-flows to achieve a path delay that is equal to a target path delay for each of the plurality of paths.

In some aspects, the processor executes instructions that cause the processor to perform the measuring by: extracting from a packet for each sub-flow of the plurality of sub-flows, time of transmission of the packet from the first node; determining a time of arrival at the second node of the packet for each sub-flow of the plurality of sub-flows; and computing a one-way delay for each of the plurality of paths based on a time difference between the time of transmission and the time of arrival of the packet for each sub-flow of the plurality of sub-flows.

In some aspects, the processor executes instructions that cause the processor to further perform: determining a maximum path delay among the one-way delay for each of the plurality of paths; and selecting the target path delay based on the maximum path delay.

In some aspects, the processor is further configured to perform: generating a delay control packet that includes the delay differences, the delay control packet to be transmitted to the first node to allow the first node to adjust a delay in a packet queue from which packets for the plurality of sub-flows are queued for transmission from the first node to the second node.

In some aspects, the techniques described herein relate to an apparatus, further including a network processor unit that includes a memory that stores the plurality of packet queues where the queue delay is applied to respective queues to achieve the path delay.

In some aspects, the processor executes instructions that cause the processor to perform: determining average path delay differences using sequence numbers of packets of the plurality of sub-flows and times of arrival of packets of the plurality of sub-flows; and selecting target path delays to compensate for the delay differences.

In some aspects, the techniques described herein relate to a system including: a first node and a second node in a network; the first node configured to transmit a plurality of sub-flows on a plurality of paths in the network to the second node, wherein the plurality of sub-flows are obtained by splitting a traffic flow; the second node configured to measure delay for each of the plurality of paths for the plurality of sub-flows and to determine delay differences among the delay for each of the plurality of paths; the first node or the second node being configured to adjust, based on the delay differences, a queue delay associated with a respective flow of the plurality of sub-flows on one or more of the plurality of paths to achieve a path delay that is equal to a target path delay for each of the plurality of paths.

In some aspects, the techniques described herein relate to a system, further including an intermediate node between the first node and the second node, wherein the intermediate node is configured to adjust the queue delay associated with a respective flow of the plurality of sub-flows on one or more of the plurality of paths to achieve a path delay that is equal to a target path delay for each of the plurality of paths.

In some aspects, the techniques described herein relate to a system, wherein the first node and the second node each includes a network processor unit that includes a memory that stores packets associated with the respective flow and in which queue delay of the packets is adjusted.

In some aspects, the techniques described herein relate to a system, wherein the first node and the second node are synchronized, and the second node is configured to measure delay by: extracting from a packet for each sub-flow of the plurality of sub-flows, time of transmission of the packet from the first node; determining a time of arrival at the second node of the packet for each sub-flow of the plurality of sub-flows; and computing a one-way delay for each of the plurality of paths based on a time difference between the time of transmission and the time of arrival of the packet for each sub-flow of the plurality of sub-flows.

In some aspects, the techniques described herein relate to a system, wherein the second node is further configured to: determine a maximum path delay among the one-way delay for each of the plurality of paths; and select the target path delay based on the maximum path delay.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method to compensate for differential delay among a plurality of paths in a network between a first node and a second node in the network, each of the first node and the second node including a de-jitter buffer memory having a storage limitation and a network processing unit that includes a buffer memory that is larger than the de-jitter buffer memory, the method comprising:
    measuring delay for each of the plurality of paths for a plurality of sub-flows transmitted between the first node and the second node on respective paths of the plurality of paths in the network, wherein the plurality of sub-flows are obtained by splitting a traffic flow;
    determining delay differences among the delay for each of the plurality of paths; and
    adjusting, based on the delay differences, a queue delay in a queue handled by the buffer memory of the network processing unit of the first node or the second node associated with a respective flow of the plurality of sub-flows on one or more of the plurality of paths to achieve a path delay that is equal to a target path delay for each of the plurality of paths.

2. The method of claim 1, wherein adjusting is performed at the first node, at the second node or at an intermediate node between the first node and the second node.

3. The method of claim 2, wherein adjusting comprises adjusting queue delay of packets associated with the respective flow that are stored in a memory of a network processor unit of the first node, the second node or the intermediate node.

4. The method of claim 1, wherein the first node and the second node are synchronized, and wherein measuring delay comprises the second node:
    extracting from a packet for each sub-flow of the plurality of sub-flows, a time of transmission of the packet from the first node;
    determining a time of arrival at the second node of the packet for each sub-flow of the plurality of sub-flows; and
    computing a one-way delay for each of the plurality of paths based on a time difference between the time of transmission and the time of arrival of the packet for each sub-flow of the plurality of sub-flows.

5. The method of claim 4, further comprising:
    determining a maximum path delay among the one-way delay for each of the plurality of paths; and
    selecting the target path delay based on the maximum path delay.

6. The method of claim 4, wherein adjusting comprises the second node:
adjusting, at the second node, a delay in a packet queue into which received packets are queued for the respective path of the plurality of paths based on the delay difference for the respective path.

7. The method of claim 1, wherein the determining delay differences is performed at the second node, and further comprising:
transmitting the delay differences in a delay control packet to the first node;
wherein adjusting comprises adjusting, at the first node, a delay in a packet queue from which packets for the plurality of sub-flows are queued for transmission from the first node to the second node.

8. The method of claim 1, wherein the first node and the second node are not synchronized, and wherein determining delay differences comprises: determining average path delay differences using sequence numbers of packets of the plurality of sub-flows and times of arrival of packets of the plurality of sub-flows, and selecting target path delays to compensate for the delay differences.

9. An apparatus comprising:
a plurality of interfaces at which a respective sub-flow of a plurality of sub-flows transmitted by a first node in a network are received at a second node via respective paths of a plurality of paths in the network between the first node and the second node, wherein the plurality of sub-flows are obtained by splitting a traffic flow, each of the first node and the second node including a de-jitter buffer memory having a storage limitation and a network processing unit that includes a buffer memory that is larger than the de-jitter buffer memory;
a plurality of packet queues configured to queue a respective sub-flow of the plurality of sub-flows; and
a processor configured to execute instructions which cause the processor to perform operations including:
measuring delay for each of the plurality of paths;
determining delay differences among the delay for each of the plurality of paths, from which a queue delay associated with a respective flow of the plurality of sub-flows on one or more of the plurality of paths is made to achieve a path delay that is equal to a target path delay for each of the plurality of paths; and
generating a queue delay associated with a respective flow of the plurality of sub-flows on one or more of the plurality of paths,
wherein the plurality of packet queues use the queue delay in a queue handled by the buffer memory of the network processing unit of the first node or the second node associated with each respective flow of the plurality of sub-flows to achieve a path delay that is equal to a target path delay for each of the plurality of paths.

10. The apparatus of claim 9, wherein the processor executes instructions that cause the processor to perform the measuring by:
extracting from a packet for each sub-flow of the plurality of sub-flows, time of transmission of the packet from the first node;
determining a time of arrival at the second node of the packet for each sub-flow of the plurality of sub-flows; and
computing a one-way delay for each of the plurality of paths based on a time difference between the time of transmission and the time of arrival of the packet for each sub-flow of the plurality of sub-flows.

11. The apparatus of claim 10, wherein the processor executes instructions that cause the processor to further perform:
determining a maximum path delay among the one-way delay for each of the plurality of paths; and
selecting the target path delay based on the maximum path delay.

12. The apparatus of claim 9, wherein the processor is further configured to perform:
generating a delay control packet that includes the delay differences, the delay control packet to be transmitted to the first node to allow the first node to adjust a delay in a packet queue from which packets for the plurality of sub-flows are queued for transmission from the first node to the second node.

13. The apparatus of claim 9, wherein the processor executes instructions that cause the processor to perform:
determining average path delay differences using sequence numbers of packets of the plurality of sub-flows and times of arrival of packets of the plurality of sub-flows; and
selecting target path delays to compensate for the delay differences.

14. A system comprising:
a first node and a second node in a network, each of the first node and the second node including a de-jitter buffer memory having a storage limitation and a network processing unit that includes a buffer memory that is larger than the de-jitter buffer memory;
the first node configured to transmit a plurality of sub-flows on a plurality of paths in the network to the second node, wherein the plurality of sub-flows are obtained by splitting a traffic flow;
the second node configured to measure delay for each of the plurality of paths for the plurality of sub-flows and to determine delay differences among the delay for each of the plurality of paths; and
the first node or the second node being configured to adjust, based on the delay differences, a queue delay in a queue handled by the buffer memory of the network processing unit of the first node or the second node associated with a respective flow of the plurality of sub-flows on one or more of the plurality of paths to achieve a path delay that is equal to a target path delay for each of the plurality of paths.

15. The system of claim 14, further comprising an intermediate node between the first node and the second node, wherein the intermediate node is configured to adjust the queue delay associated with a respective flow of the plurality of sub-flows on one or more of the plurality of paths to achieve a path delay that is equal to a target path delay for each of the plurality of paths.

16. The system of claim 14, wherein the first node and the second node are synchronized, and the second node is configured to measure delay by:
extracting from a packet for each sub-flow of the plurality of sub-flows, time of transmission of the packet from the first node;
determining a time of arrival at the second node of the packet for each sub-flow of the plurality of sub-flows; and
computing a one-way delay for each of the plurality of paths based on a time difference between the time of transmission and the time of arrival of the packet for each sub-flow of the plurality of sub-flows.

17. The system of claim 16, wherein the second node is further configured to:
  determine a maximum path delay among the one-way delay for each of the plurality of paths; and
  select the target path delay based on the maximum path delay.

18. The method of claim 1, wherein a fill level of the queue determines the queue delay applied to packets serviced by the queue based on a traffic shape rate configured for the queue, where queue delay is equal to the fill level multiplied by a constant divided by the traffic shape rate.

19. The apparatus of claim 9, wherein a fill level of the queue determines the queue delay applied to packets serviced by the queue based on a traffic shape rate configured for the queue, where queue delay is equal to the fill level multiplied by a constant divided by the traffic shape rate.

20. The system of claim 14, wherein a fill level of the queue determines the queue delay applied to packets serviced by the queue based on a traffic shape rate configured for the queue, where queue delay is equal to the fill level multiplied by a constant divided by the traffic shape rate.

* * * * *